April 17, 1934.   E. A. HALL   1,955,182
SUCTION DEVICE FOR CYLINDER BORING MACHINES
Filed Oct. 19, 1932
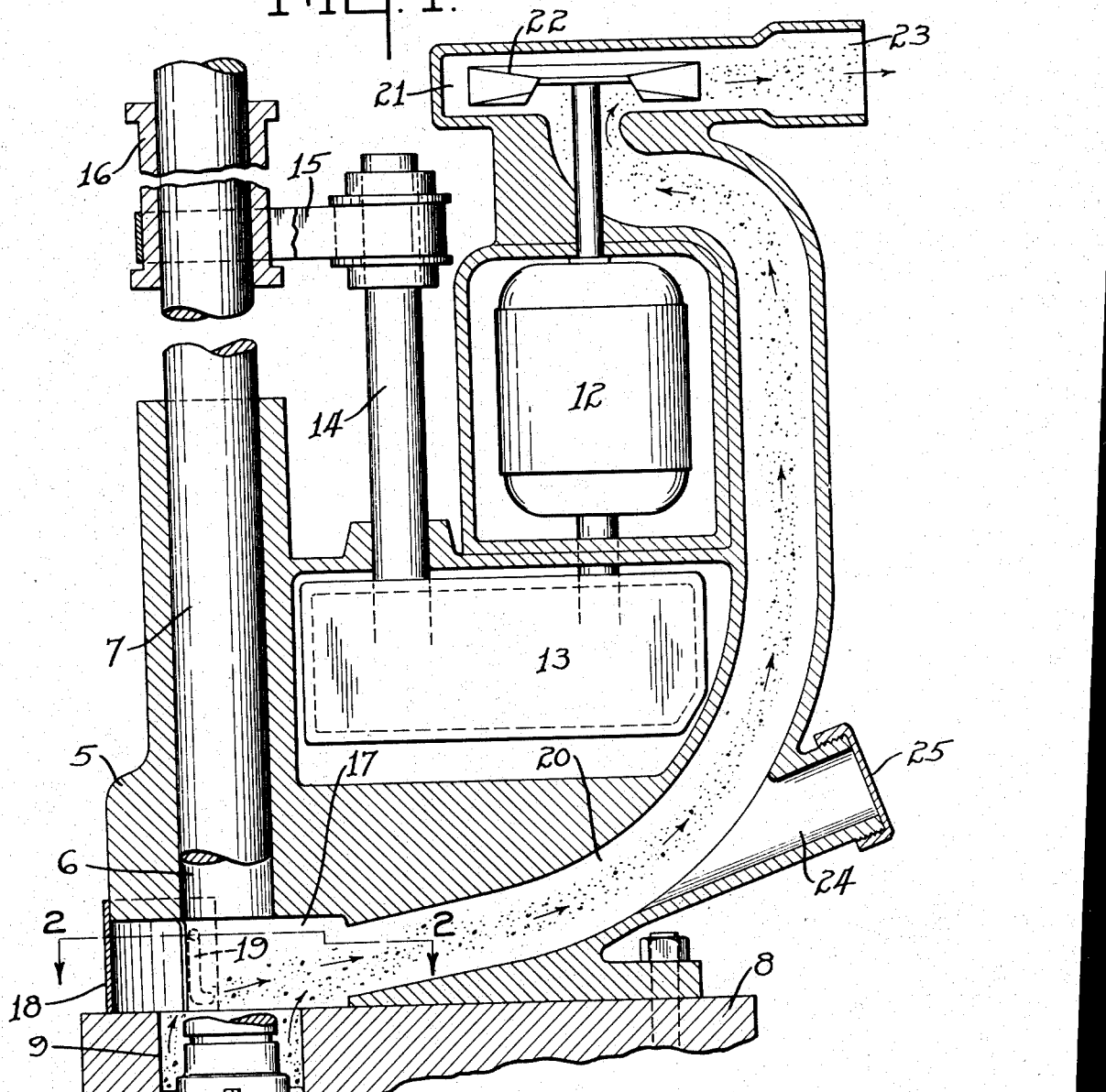
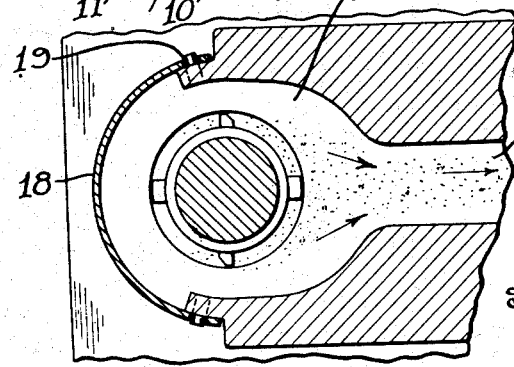
Inventor
Ernest A. Hall
By Owen & Owen
Attorneys Patented Apr. 17, 1934

1,955,182

UNITED STATES PATENT OFFICE 1,955,182

SUCTION DEVICE FOR CYLINDER BORING MACHINES

Ernest A. Hall, Toledo, Ohio, assignor to The Hall Manufacturing Company, Toledo, Ohio, a corporation of Ohio Application October 19, 1932, Serial No. 638,575

4 Claims. (Cl. 77—2)

This invention relates to a suction device for removing cuttings formed by a cylinder boring machine during its operation.

Heretofore, in the operation of cylinder boring machines, the chips or cuttings have been allowed to drop down through the lower end of the cylinder. In order to remove such cuttings, if the cylinders are bored while the block is still on the chassis, it has been necessary for a workman to get down under the car and to reach the lower ends of the cylinders through the upper part of the crankcase. This is a troublesome and dirty operation and is usually dangerous.

With the above facts in mind, it is the object of the present invention to provide a device in connection with a cylinder boring machine, which is adapted to remove the cuttings from the cylinder head by suction as fast as they are formed and to deposit them at a distant place while the boring machine is in operation.

One embodiment of the invention will be particularly described in connection with the accompanying drawer, in which Fig. 1 is a central vertical section through the same, and Fig. 2 is a section taken on the line 2—2 of Fig. 1.

As illustrated in the drawing, the boring machine comprises a housing 5 provided with a bearing 6 in which the boring bar 7 is mounted for rotation. The housing 5 is adapted to be bolted to the engine block 8 in such a position that the boring bar 7 is in alignment with the cylinder 9 which is to be bored. The boring bar 7 is provided with a head 10 in which the cutters 11 are mounted in a well known manner.

The boring bar 7 is adapted to be driven by a suitable motor 12 mounted in the upper part of the housing 5 and connected through a gear box 13 to a countershaft 14 which has a driving connection 15 with a pulley 16 or similar driving element secured to the shaft 7.

In accordance with the invention, the housing 5 is formed with a cavity 17 which is adjacent to the upper end of the cylinder 9 when the machine is in position for operation. After the machine has been adjusted ready for operation, the cavity 17 may be closed by a cover 18 which is slidably connected with the housing through pin and slot connections 19. Thus, when the machine is locked in place on top of the block and the cutters 11 expanded to the desired size, the cover 18 is closed so that the upper end of the cylinder is completely covered.

A passageway 20 leads from the cavity 7, and in the present embodiment extends upwardly to a chamber 21 within which is a fan 22 driven by the motor 12. The chamber 21 has an outlet 23 and whenever the motor is operated to drive the cutters, the fan 22 is also driven to create a current of air upwardly from the cylinder 9 through the passageway 20. This current is strong enough to carry all cuttings upwardly and away from the cylinder as fast as they are removed from the cylinder wall. It is preferred also to provide an outlet 24 from the passageway 20 so that an independently driven suction device may be attached thereto, if desired. A cap 25 may be provided to close either outlet 23 or 24 which is not being used.

The suction device, therefore, may be mounted either within the housing 5 or independently thereof, and may be driven by the same motor which drives the boring bar or driven independently thereof. The arrangement of the housing, the motor, and the parts driven thereby may also be considerably modified without departing from the scope of the invention as claimed.

What I claim is:—

1. In a cylinder boring machine, a housing, a boring bar mounted in the housing and provided with a boring element, means for securing said housing with the cutting element in position for operation on a cylinder, a motor for driving said boring bar, means associated with said housing and adjustable to enclose the upper end of the cylinder while the housing is thus secured, said housing being provided with a passageway leading outwardly from such enclosure, a shaft extending into said passageway and driven by said motor, and means within said passageway and driven by said shaft to create suction to carry away all cuttings through said passageway as fast as they are removed from the cylinder wall by the cutting element.

2. In a cylinder boring machine, a housing, a boring bar mounted in the housing and provided with a boring element, means for securing said housing with the cutting element in position for operation on a cylinder, a motor for driving said boring bar, means adjustable with reference to said housing to form in conjunction therewith an enclosure for the upper end of the cylinder while the housing is thus secured, said housing being provided with a passageway leading outwardly from said enclosure, the shaft of the motor being extended into said passageway, and a fan secured to the motor shaft within said passageway to create a draft to carry away all cuttings through said passageway as fast as they are removed from the cylinder wall by the cutting element.

3. In a cylinder boring machine, a housing with a passageway therethrough, a boring bar mounted in the housing and provided with a cutting element, means for securing said housing with the cutting element in position for operation on a cylinder and with the inlet end of said passageway in communication with said cylinder, a motor having a shaft in driving relation to said boring bar, one end of said shaft being extended into said passageway, a fan secured to the motor shaft within said passageway to create a draft for conveying cuttings away from the cylinder through said passageway as fast as they are removed from the cylinder wall by the cutting element, and means for preventing the intake of air into said passageway, except such air as passes through said cylinder.

4. In a cylinder boring machine, a housing, a boring bar mounted in the housing and provided with a cutting element, means for securing said housing with the cutting element in position for operation on a cylinder, a motor having a shaft in driving relation to said boring bar, said housing having a cavity above the cutting element, a fan secured to the motor shaft to create a draft for removing cuttings from the cylinder through said cavity to a remote point, and removable means for preventing induction of air to said cavity, except such air as passes through said cylinder.

ERNEST A. HALL.